US008732166B1

(12) United States Patent
Strand

(10) Patent No.: US 8,732,166 B1
(45) Date of Patent: May 20, 2014

(54) PROVIDING DYNAMICALLY-GENERATED BOOKMARKS OR OTHER OBJECTS WHICH ENCOURAGE USERS TO INTERACT WITH A SERVICE

(75) Inventor: William Alexander Strand, Kent, WA (US)

(73) Assignee: Amazon Technologies, Inc., Reno, NV (US)

( * ) Notice: Subject to any disclaimer, the term of this patent is extended or adjusted under 35 U.S.C. 154(b) by 1814 days.

(21) Appl. No.: 11/611,074

(22) Filed: Dec. 14, 2006

(51) Int. Cl.
*G06F 17/30* (2006.01)

(52) U.S. Cl.
CPC ............................. *G06F 17/30864* (2013.01)
USPC ........................... 707/728; 707/710; 707/802

(58) Field of Classification Search
CPC ................................................ G06F 17/30864
USPC ................. 707/710, 802, 723, 726, 728, 732; 715/206; 455/3.06
See application file for complete search history.

(56) References Cited

U.S. PATENT DOCUMENTS

| 7,392,481 | B2* | 6/2008 | Gewickey et al. | ............. 715/716 |
| 7,624,337 | B2* | 11/2009 | Sull et al. | ...................... 715/201 |
| 2002/0120925 | A1* | 8/2002 | Logan | .................................. 725/9 |
| 2007/0021055 | A1* | 1/2007 | Arseneau et al. | ............. 455/3.06 |
| 2007/0067297 | A1* | 3/2007 | Kublickis | ............................. 707/9 |

OTHER PUBLICATIONS

Keller, Richard M. et al., "A bookmarking service for organizing and sharing URLs", Computer Networks and ISDN Systems 29 (1997), pp. 1103-1114.*

* cited by examiner

*Primary Examiner* — Shahid Alam
(74) *Attorney, Agent, or Firm* — Lee & Hayes, PLLC

(57) ABSTRACT

A strategy is described for delivering requested books to users along with customized bookmarks or other functional objects. An exemplary bookmark can include various informational items, including an informational item that describes the delivered book, an informational item that rates the desired book, an informational item that recommends one or more other books based on various factors, and an informational item that provides a call-to-action. The call-to-action encourages the user to access an electronic service to review the delivered book, purchase one or more additional books, or take some other action. The electronic service can provide accounting which identifies and registers user actions that are motivationally linked to the information imparted by the bookmarks.

24 Claims, 10 Drawing Sheets

700

800

PROVIDING DYNAMICALLY-GENERATED BOOKMARKS OR OTHER OBJECTS WHICH ENCOURAGE USERS TO INTERACT WITH A SERVICE

BACKGROUND

A bookmark serves the traditional role of marking a page in a book. Bookmarks commonly include information printed thereon. For instance, bookmarks may include pictures, quotes, calendar information, and so on. Bookmarks sometimes also serve as advertising material. For example, bookmarks may identify the names of various commercial entities.

A manufacture may produce the same message-bearing bookmarks for distribution to a single generic group of recipients. The bookmarks may thus have the look and feel of bulk-mailed advertising material. As a possible consequence, the bookmarks may fail to properly capture the interest of some of the recipients. Further, as appreciated by the present inventor, the bookmarks may convey certain information as an end in itself, rather than prompting the recipients to take specific actions. For these exemplary reasons, traditional bookmarks may not be a sufficiently effective tool in directing recipients' behavior to desired ends.

SUMMARY

A strategy is described for delivering requested books (or other articles) to users along with customized bookmarks (or other functional objects). An exemplary bookmark can impart information that is customized for a user based on various factors. The information can also include call-to-action information that encourages the user to access an electronic service to take one or more solicited actions. For instance, the call-to-action information may encourage the user to access the electronic service to enter review-type comments regarding a delivered book. Or the call-to-action information may encourage the user to access the electronic service to purchase one or more recommended books. The electronic service can provide accounting which identifies and records the actions of the users which are motivationally linked to the information imparted by the bookmarks.

The strategy confers various benefits. According to one exemplary benefit, the bookmarks are customized for the users based on various factors, and are therefore more likely to capture the interest of the users (compared to traditional bookmarks). According to another exemplary benefit, the call-to-action information seamlessly integrates the users' book-reading experience with the user' subsequent interaction with the electronic service, thereby effectively directing the users' behavior to desired ends. The electronic service can benefit from the strategy by collecting valuable metadata regarding the books it delivers. For instance, the electronic service can collect metadata in response to the call-to-action information which encourages the users to enter comments regarding books. The bookmarks may also contribute to increased book sales, e.g., in response to book recommendations conveyed by the bookmarks.

Additional illustrative implementations and attendant benefits are described in the following.

Figure 1:
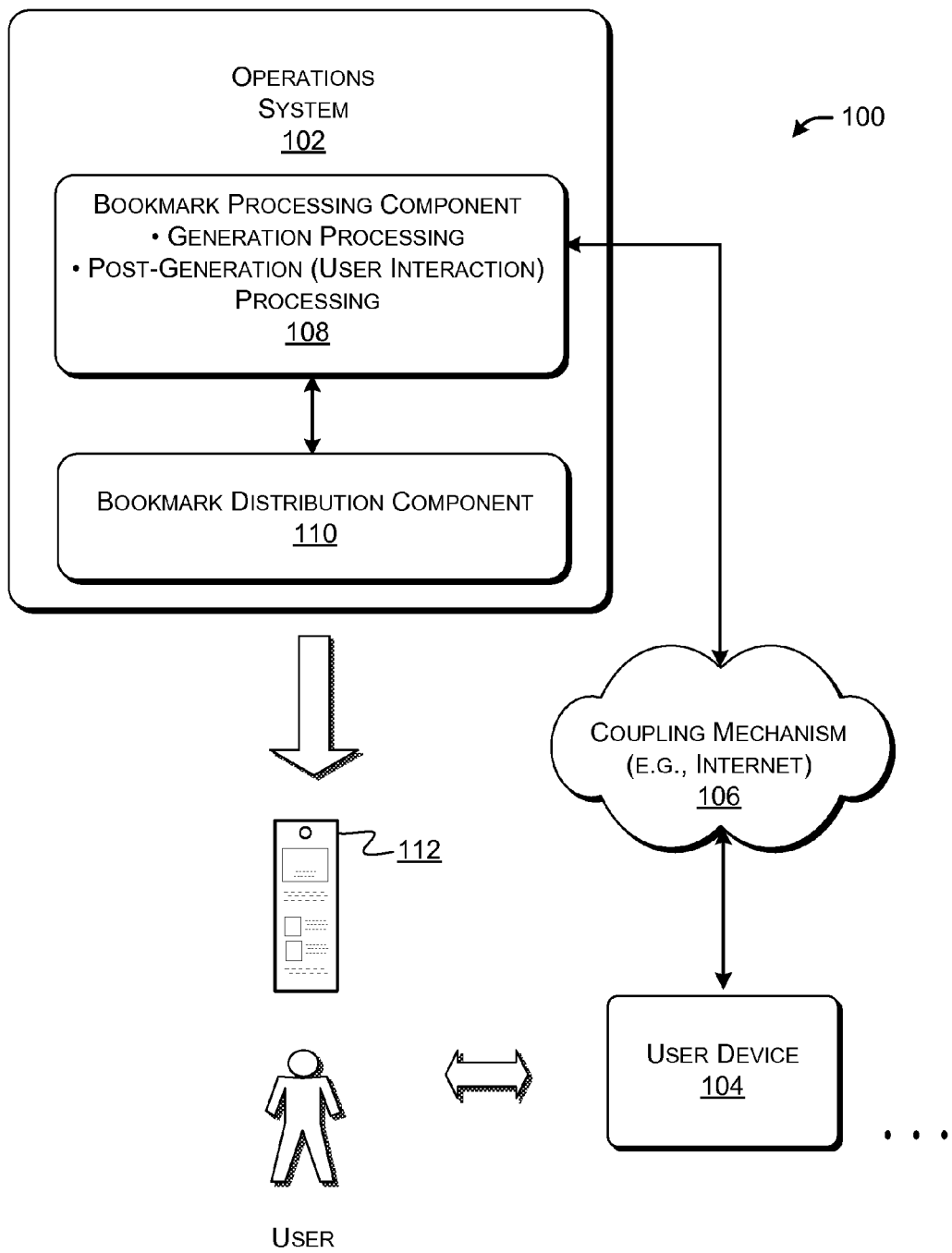
FIG. 1 shows an overview of one system for delivering bookmarks and other functional objects to users, and for interacting with the users based on information imparted by the bookmarks or other functional objects.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for providing enhanced bookmarks and other functional objects to users, along with articles ordered by the users. The enhanced bookmarks are customized to improve the perceived relevance of the bookmarks to the users. Further, the bookmarks include specific call-to-action information which entices the users to interact with an electronic service. The strategy can be manifested in various systems, methods, apparatuses, computer readable media, data structures, and other elements.

The term "article" as used herein refers to any kind of item. In one example, an article may refer to something that can be acquired by the user, such as media content (a book, a musical piece, etc.), other tangible article (e.g., a camera, clothing article, etc.), downloadable digital content of any nature, and so forth.

The term "functional object" as used herein refers to any kind of item that has an intended function with respect to an article (or articles). For example, a bookmark is a functional object which serves the function of marking a page in a book. To facilitate discussion, the present disclosure is framed mainly in the context of the delivery of books (constituting one instance of "articles") and accompanying bookmarks (constituting one instance of "functional objects"), but the principles described herein apply to other types of articles and functional objects.

This disclosure includes the following sections. Section A describes an illustrative system for generating enhanced bookmarks to users and for interacting with the users after delivery of the bookmarks. Section B describes illustrative procedures that explain the operation of the system of Section A.

A. Illustrative Systems

As a preliminary matter, the terms logic, module, component, functionality, or system generally represent hardware, software, firmware or a combination of these elements, or yet some other kind of implementation. For instance, in the case of a software implementation, the terms logic, module, component, functionality, or system represent program code that perform specified tasks when executed on a processing device or devices (e.g., CPU or CPUs). The program code can be stored in one or more machine-readable media.

The term machine-readable media or the like refers to any kind of medium for retaining information in any form, including various kinds of storage devices (magnetic, optical, static, etc.). The term machine-readable media also encompasses transitory forms of representing information, including various hardwired and/or wireless links for transmitting the information from one point to another.

A.1. Overview of the System

FIG. 1 shows an overview of one exemplary system 100 for generating bookmarks (or other functional objects) and then delivering the bookmarks to users. The system 100 also interacts with the users who are motivated to access an electronic service based on information imparted by the bookmarks. The system 100 can include an operations system 102 for interacting with a plurality of user devices (such as representative device 104) via a communication mechanism 106.

Beginning with the hardware-related aspects of the system 100, the operations system 102 can be implemented as one or more components which cooperate to provide an electronic service to users. Each of the components can include one or more server computers (e.g., as a "farm" of such computer servers) and/or other equipment. Generally, the components of the operations system 102 can be located at a single site (e.g., facility) or plural sites. The components of the operations system 102 can be managed by a single entity or plural entities. The device 104 represents any kind of electronic unit which can interact with the operations system 104 via the coupling mechanism 106.

Figure 2:
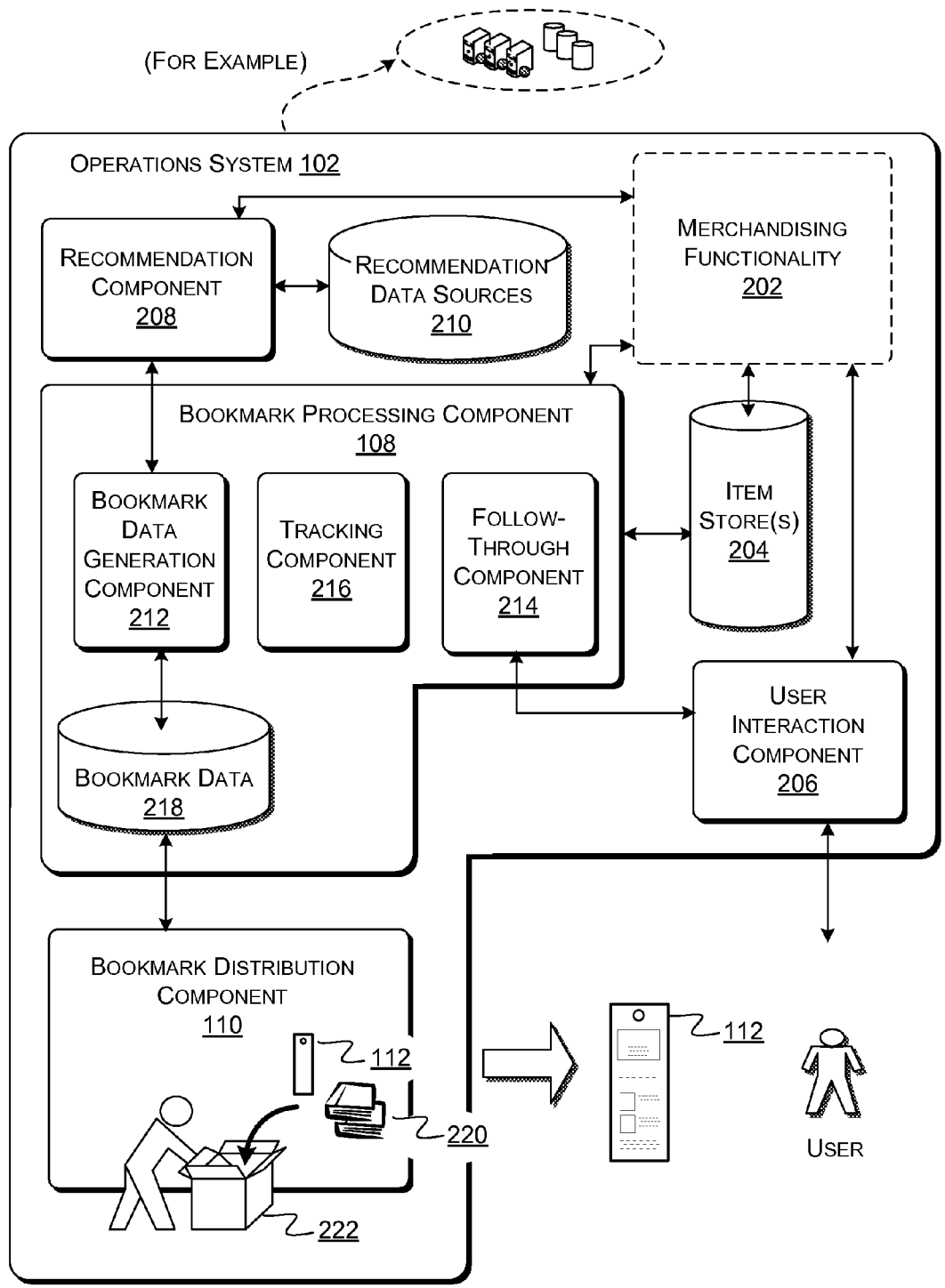
FIG. 2 shows an operations system that can be used in the system of FIG. 1.
Figure 3:
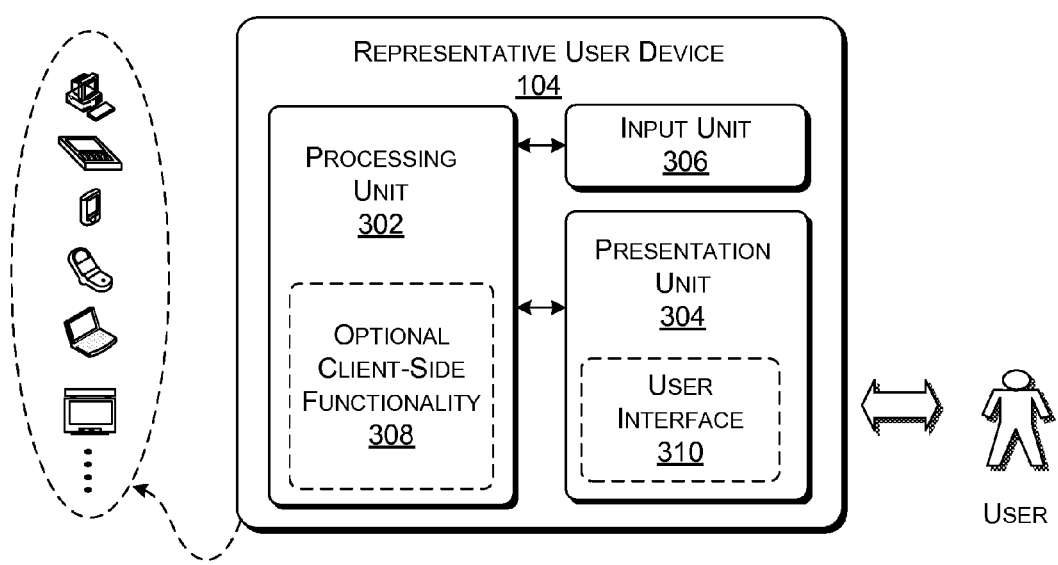
FIG. 3 shows a client device that can be used in the system of FIG. 1.
Figure 9:
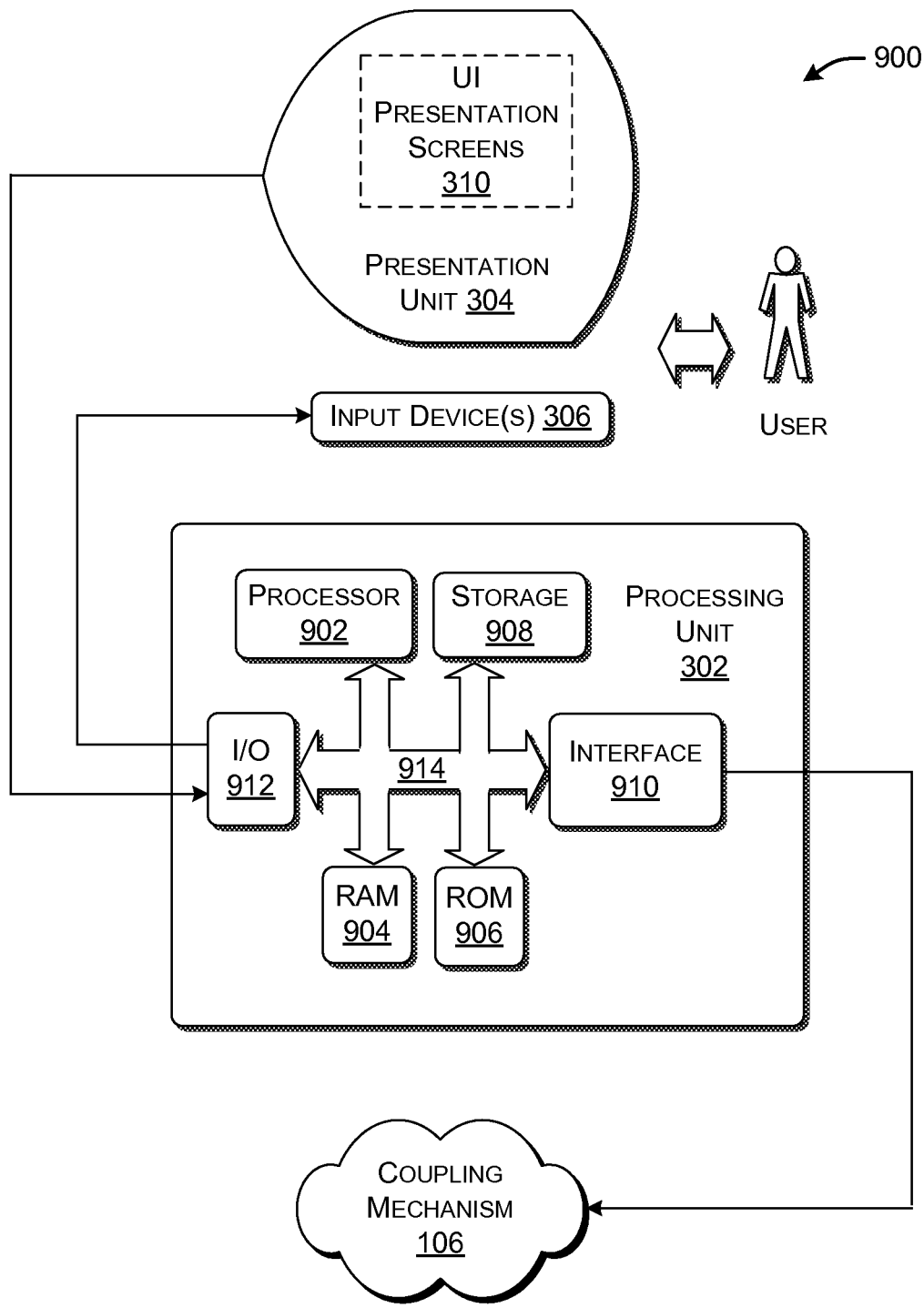
FIG. 9 shows illustrative processing functionality for implementing any aspect of the system shown in FIG. 1.

FIGS. 2 and 3, to be discussed below in turn, show additional detail regarding the exemplary composition of the operations system 102 and the representative user device 104, respectively. FIG. 9, to be discussed below in turn, provides still further details regarding equipment that can be used to implement any aspect of the operations system 102 or the representative device 104.

The coupling mechanism 106 can correspond to any kind of communication conduit or combination of communication conduits. In the case most commonly evoked in this disclosure, the coupling mechanism 106 corresponds to a wide area network, such as the Internet. However, the coupling mechanism 106 can alternatively, or in addition, comprise other kinds of communication conduits, such as an intranet, point-to-point coupling arrangement, and so forth. In any case, the coupling mechanism 106 can include any combination of hardwired links, wireless links, routers, repeaters, gateways, name servers, and so forth (not shown), governed by any protocol or combination of protocols.

Now turning to the functional aspects of the system 100, the operations system 102 may implement an electronic service devoted to selling articles to users. For instance, the operations system 102 may correspond to one or more Internet-accessible websites with which users may interact via their user devices 104. The users may use the operations system 102 to search for particular articles, purchase (or otherwise acquire) selected articles, enter online reviews pertaining to articles, and so on. The articles may correspond to media articles (e.g., physical or electronic books, music content, video content, etc.), or the articles may correspond to other types of goods (e.g., clothing articles, jewelry, electronic equipment etc.). In other cases, the electronic service may allow users to acquire any kind of article in any kind of non-merchandising context.

The system 102 supplements a merchandising website by including a bookmark processing component 108 and a bookmark distribution component 110. These two components (108, 110) can be implemented at the same site or at plural respective sites. These components (108, 110) can be administered by the same entity or by different respective entities.

The purpose of the bookmark processing component 108 is twofold. First, this component 108 generates custom bookmarks to accompany articles ordered by users. More specifically, in one case, a user may order one or more books by interacting with the operations system 102 in conventional fashion. In response, the bookmark processing component 108 generates one or more bookmarks for delivery to the user along with the ordered books. In one embodiment, the bookmark processing component 108 generates the bookmarks in an on-demand fashion in the sense that book-ordering events trigger the generation of the bookmarks. Moreover, the bookmark processing component 108 customizes the bookmarks that it generates based on one or more factors, including, in part, the nature of the books being ordered, the demographic characteristics of the users, and so on. In one case, the bookmark processing component 108 generates one or more bookmarks for every delivery. In another case, the bookmark processing component generates one or more bookmarks for only certain deliveries, such as only when certain triggering books are purchased.

A second purpose served by the bookmark processing component 108 is, in one embodiment, to interact with the users following the delivery of the bookmarks. Namely, as will be described in greater detail below, the bookmarks include various informational items, including recommendation information and call-to-action information The recommendation information provides suggestions for other articles (e.g., books) that can be purchased (or otherwise acquired) by the users. The call-to-action information provides messages that encourage the users to access the electronic service to perform suggested actions. The bookmark processing component 108 handles the interaction with the users when the users respond to the call-to-action information by contacting the electronic service. Additional details regarding the operation of the bookmark processing component 108 are provided below in the next subsection.

The purpose of the bookmark distribution component 110 is to deliver the articles and associated bookmarks to the users. More specifically, in one implementation, the bookmark distribution component 110 includes functionality for physically creating the bookmarks based on data generated by the bookmark processing component 108, placing the bookmarks into packages along with the associated articles, and delivering the packages to respective recipient users. In another implementation, the bookmark distribution component 110 may deliver the bookmarks and the books via two or more separate delivery channels.

FIG. 1 shows one exemplary bookmark 112. The bookmark 112 serves its traditional role of marking a location within a book by being placed between two pages in the book. As will be described more completely below, the bookmark 112 includes plural fields which impart various so-called informational items, including the recommendation information and the call-to-action information.

The principles of FIG. 1 have been mainly framed in the context of books and bookmarks. However, the principles can be applied to other types of articles and associated functional objects. To name merely one illustrative example, upon request, the operations system 102 can deliver cooking supplies to a user. The operations center 102 can also send the user a pot holder, wherein the pot holder serves the traditional role of allowing a user to handle hot pots and pans. In this context, the delivered article constitutes the cooking supplies. The delivered functional object constitutes the pot holder. The pot holder, like the bookmark, can impart information which encourages the user to contact the operations system 102 to perform one or more targeted actions.

In another case, the operations system 102 can deliver an electronic media item to the user in association with one or supplemental fields of electronic information. The media item can comprise an electronic book (eBook), music, video, game, etc. The supplemental fields serve any kind of supplemental role in association with the consumption of the media item, such as one or more menu selection pages which allow the user to navigate through the media item, one or more markers which mark one or more locations within the media item, and so forth. In this context, the delivered article constitutes the media item and the delivered functional object constitutes the supplemental fields. The supplemental fields, like the physical bookmark, can impart information which encourages the user to contact the operations system 102 to perform one or more actions.

To name one specific example of the above-described implementation, the delivered article can comprise a digital video. The system 100 can download this video to the user or can ship a physical storage medium (e.g., a DVD or the like) to the user which stores the video, and so on. The video can include supplemental information in the form of a marker field. The marker field serves a role that is similar to a physical bookmark—that is, by allowing a user to mark a particular juncture within the presentation of the video. The video may show the marker field as an overlay on a particular frame of the video and/or within a navigation selection page, and/or at some other juncture in the presentation of the video. The marker field can include the types of information described above, such as a recommendation for one or more additional videos, an enticement to contact an electronic service to perform some identified action, and so on.

In another application, a marker field can be added to a computerized game to mark the user's progress within the game. The marker field can function in a manner similar to that described above.

Still additional implementations are envisioned. Nevertheless, so as to not unduly complicate the present discussion, the principles of the system 100 will continue to be set forth mainly in the context of books and bookmarks, with the understanding the principles can be extended to other articles and functional objects.

A.2. Overview of Operations System

FIG. 2 shows one exemplary composition of the operations system 102 in greater detail. As per the above introductory explanation, the operations system 102 can represent one or more components, provided at a single site or distributed over plural sites. The components can be administrated by the same entity or a combination of plural entities.

This subsection provides additional details regarding the operations system 102, describing each of its components in turn.

To begin with, the bookmark processing components of the operations system 102 can be integrated with other components that provide a network-accessible merchandising service. In connection therewith, FIG. 2 shows that the operations system 102 includes generically-labeled "merchandising functionality" 202. This functionality 202 may include components which enable a user to locate books (and other articles) from a catalog provided by one or more item stores 204. The user may locate books (and other articles) in a conventional manner, e.g., by inputting key terms associated with desired books, browsing through subject matter topics relating the desired books, and so forth. The merchandising functionality 202 may also include functionality that allows the user to purchase (or otherwise acquire) one or more selected books, enter book reviews, access and create wish lists, and so on.

In conventional fashion, various aspects of the operations system 102 may be separated into frontend and backend components. The frontend components provide functionality which allows the user to interact with the operations system 202, e.g., via various user interface presentations. The backend components perform underlying processing operations, e.g., supplying information for presentation via the frontend components, performing various order processing and accounting operations, and so on. A user interaction component 206 shown in FIG. 2 can implement the frontend aspects of the operations system 202, while the other components of the operations system 202 may largely represent backend components.

The merchandising functionality 202 may interact with a recommendation component 208. The purpose of the recommendation component 208 is to generate recommendations to users, inviting the users to purchase (or otherwise acquire) one or more books (or other articles). The recommendation component 208 can rely on any algorithm or combination of algorithms to generate recommendations. Broadly stated, the recommendation component 208 can generate custom recommendations to each user to match the presumed interests of the user. In assessing the interests of the users, the recommendation component 208 can draw on one or more recommendation data sources 210. The recommendation data sources 210 can include any information which has a possible bearing on the interests of the users, such as the past article selections of the users (representing prior purchases, shopping cart selections, wish list selections, click-through selections, and so on). The recommendation data sources 202 can also include demographic information regarding the users, e.g., identifying the ages, genders, education levels, geographic locations, etc. of users. Finally, the recommendation component 208 can also draw on the catalog information stored in the item stores 204 as a recommendation data source. The explanation provided below sets forth additional details regarding how the recommendation component 208 can generate recommendations when generating bookmarks (or other functional objects).

Recall from the above explanation that the operations system 202 includes two main components for handling bookmarks—the bookmark processing component 108 and the bookmark distribution component 110. The purpose of the bookmark processing component 108 is to generate customized bookmarks in an on-demand fashion, and subsequently, to interact with users when the users access the operations system 202 to carry out various actions solicited by the bookmarks. The purpose of the bookmark distribution component 110 is to deliver books and bookmarks to users. In one case, the same entity administers both the bookmark processing component 108 and the bookmark distribution component 110. In another implementation, two different entities can administer these two components (108, 110).

The functions that the bookmark processing component 108 performs can be separated into three sub-functions, represented by a bookmark data generation component 212, a follow-through component 214, and a tracking component 216. Each of these components will be described in turn below.

One purpose of the bookmark data generation component 212 is to generate the information that will be printed on the bookmark 112, or which will otherwise appear on or in association with the bookmark 112. One part of the information that is printed on the bookmark 112 may be static. This part does not depend on the context in which the bookmark 112 is generated. Hence, this part may be the same for an entire population of bookmark recipients. Another part of the information that is printed on the bookmark 112 is dynamic. This part does depend on the context in which the bookmark 112 is generated. Hence, this part can be expected to differ from user to user. In general, different pieces of information that are printed on the bookmark 112 are referred to as "informational items" herein.

Generally, the static informational items can appear on either side of the bookmark 112 or both sides of the bookmark 112. In one case, a printer at the bookmark distribution component 110 can print the static and dynamic informational items on a bookmark substrate. In another implementation, the bookmark distribution component 110 can print dynamic informational items on a substrate on which one or more static informational items have been pre-printed. Another entity (e.g., a paper stock supplier) can furnish the book distribution component 110 with bookmark material having the static informational items pre-printed thereon. Still other implementations are possible.

The bookmark data generation component 212 can provide various kinds of static informational items.

One static informational item supplies entity information. The entity information may identify a name of the electronic service that provides the books and bookmark 112, and/or the entity which interacts with the users following delivery of the bookmark 112. An electronic service may wish to print its name on the bookmark 112 because a user may be expected to handle this item often while reading the book, and thus the bookmark 112 may be an effective vehicle for exposing the service's name to the user.

Another static informational item can provide textual and pictorial information that is to be printed on the bookmark 112, such as background information having a prescribed pattern or picture.

Another static informational item can provide static advertising information that is the same for all recipient users.

The bookmark data generation component 212 can also provide various kinds of dynamic informational items.

One such dynamic informational item can comprise description information. Description information provides a description of the book (or plural books) that the user has ordered. The description information can include textual and/or pictorial information associated with the book (or books).

Another dynamic informational item can comprise rating information. The rating information conveys a rating given to the ordered book (or books) by a group of other users. For instance, the rating information can comprise an average rating, and may be expressed in the conventional multi-star format.

Another dynamic informational item can comprise recommendation information. The recommendation information recommends one or more other books (or other kinds of articles) to the users. Further information regarding the generation of this item appears below.

Another dynamic informational item can comprise call-to-action information. As the name suggests, this information encourages the user to take a specific action. Further information regarding the generation of this informational item appears below.

Another dynamic informational item can comprise code information. The code information uniquely identifies the bookmark and the circumstances surrounding the printing of bookmark (e.g., the fact that the bookmark was generated in response to the purchase of one or more books). As will be discussed, the user can enter the code information into the follow-through component 214 when subsequently interacting with the electronic service. The code information enables the follow-through component 214 to potentially provide a user interface presentation that is customized on the basis of the code information. The tracking component 216 can also utilize the entered code information to record the fact that the user's online actions were ultimately prompted by the delivery of a bookmark to the user.

Now providing further information regarding the generation of recommendation information, the bookmark data generation component 212 can rely on the recommendation component 208 to generate recommendations that will be printed on the bookmarks. The recommendation component 208, in turn, can rely on various algorithms or a combination of algorithms to generate the recommendations. The following is a non-exhaustive and exemplary list of different approaches that can be taken to generate recommendations. Each of these approaches can be applied by itself on in combination with other approaches.

In one approach, the recommendation component 208 can make recommendations based on information regarding prior selections made by a population of users. The recommendation data sources 210 may store such selection information. The selections include purchase selections, shopping cart selections, wish list selections, click-through selections, and other kinds of actions that may evince the interests of users in various books or other articles. The recommendation component 208 can also rely on information that indicates the manner in which certain user selections are related to other user selections. For instance, these relationships may be structured in the form of "X percent of people who bought item M also bought item N." The recommendation component 208 applies this type of information in the following manner. Assume that the user has purchased item M. In the course of fulfilling this order, the recommendation component 208 can generate a recommendation for an item N to appear on the bookmark 112 (wherein the bookmark 112 will accompany the delivery of item M). The recommendation component 208 makes this recommendation based on the knowledge that many people who bought book M also bought book N, and thus there is a good probability that the two items are related.

In another approach, the recommendation component 208 can generate recommendations based on the demographic characteristics of the users, including age, gender, place of residency, and so on. The recommendation data sources 210 may store such demographic information. For instance, based on the knowledge that a user who purchased item M is a teenager, the recommendation component 208 can generate a recommendation to appear on the bookmark 112 that is appropriate for teen consumers.

In another approach, the recommendation component 208 can generate recommendations based on previously entered user reviews. The recommendation data sources 210 may store information regarding such reviews. For example, the recommendation component 208 will be more likely to recommend the book N if it can determine that this book has a high rate of approval among users.

In another approach, the recommendation component 208 can generate recommendations based on common characteristics of books. Item store 204 stores metadata regarding the books. For example, the recommendation component 208 can recommend items that have the same author as a purchased book M, the same genre as the purchased book M, and so on.

In another approach, the recommendation component 208 can favor certain articles because they have just been released, or are currently on the best-seller list, and so forth.

In another approach, the recommendation component 208 can generate recommendations in response to seasonal considerations. For example, as the Christmas season draws near, the recommendation component 208 can provide recommendations that emphasize certain articles that have proven to be popular as Christmas gifts.

The recommendation component 208 can rely on still other kinds of algorithms and sources to generate recommendations to appear on the bookmark 112.

Now turning to the informational item that provides call-to-action information, the bookmark data generation component 212 can provide a variety of messages which solicit specific actions from the user.

In one approach, the bookmark data generation component 212 can prompt the user to access the electronic service to enter a review for one or more books (or other articles) that the user has purchased. This information is valuable to the electronic service because it improves the metadata regarding books and other articles that it offers. Improved metadata, in turn, enables the electronic service to improve the amount of relevant information that it can provide to users in product detail pages and the like. Further, the reviews allow the electronic service to potentially provide better recommendations to the users.

In another approach, the bookmark data generation component 212 can prompt the user to access the electronic service to purchase (or otherwise acquire) one or more books (or other articles) that are recommended by the bookmark 112.

In another approach, the bookmark data generation component 212 can prompt the user to access the electronic service to explore the items offered by a particular merchant, product line, or genre of articles, etc. For example, the bookmark data generation component 212 can generate a message which reads, "Log on to AnyMerchant.com and see what XYZ Store has to offer in footwear for the fall season!"

In another approach, the bookmark data generation component 212 can prompt the user to access the electronic service, but otherwise not invite the user to take a specific action. For instance, the bookmark data generation component 212 can generate a message that reads, "Log on to AnyMerchant.com to explore what we have to offer!"

In another approach, the bookmark data generation component 212 can prompt the user to access the electronic service by adopting an air of mystery, hints of benefits, and so forth. For example, the bookmark data generation component 212 can generate a message that reads, "If you liked John Jone's "Washington Travel Guide," log on to AnyMerchant.com and see what else we have waiting for you!" Another type of "teasing" message intended to pique the user's interest is, "You have a big discount waiting for you on your next purchase. Log on to AnyMerchant.com to see what it is!"

The bookmark data generation component 212 can prompt the user to take any other action. In general, the bookmark data generation component 212 can encourage the user to participate in any feature or campaign being offered by the electronic service.

After generating the bookmark data, the bookmark data generating component 212 can store the data in one or more bookmark data stores 218. The bookmark data generation component 212 can index this data in any suitable manner, such as by an order code associated with the user's order.

The bookmark distribution component 110 next comes into play by physically creating a bookmark based on the bookmark data stored in the data stores 218, and then distributing the created bookmark to the user. In one case, the bookmark distribution component 110 can represent a fulfillment center or an entire system of fulfillment centers. In operation, the bookmark distribution component 110 may automatically (and/or manually) access the books 220 ordered by the user and automatically (and/or manually) place the books into one or more packages 222 for delivery to the user. The bookmark distribution component 110 adds billing statements and the like to the package 222 at one or more stages in the processing performed by the bookmark distribution component 110. In one implementation, the bookmark distribution component 110 can print (or otherwise create) the bookmark 112 at approximately the same time that the billing statement (and like printed material) is generated. Then, the bookmark distribution component 110 can add the finished bookmark to the package 222 along with the billing statement (and like printed material).

The bookmark distribution component 110 can alternatively produce the bookmark 112 at another juncture in the fulfillment processing. In another case, the system 100 can print the bookmark 112 elsewhere, and physically transport the bookmark 112 to the bookmark distribution component 110 for inclusion in the package to be delivered to the user.

As mentioned above, the information printed on the bookmark 112 (or otherwise included on the bookmark) can include any combination of static information and dynamic information. The bookmark distribution component 110 can alternatively print just the dynamic informational items on a substrate that is pre-printed with the static informational items.

In another implementation, the bookmark distribution component 110 can deliver the bookmark 112 and the book (or other article) to the user via separate channels. For example, the bookmark distribution component 110 can ship the ordered book to the user in one or more physical packages, yet send the bookmark data to the user in one or more electronic messages, such as one or more Emails. In doing so, the system 100 is relying on the recipient to print out the bookmark data to create the physical bookmark. In yet another example, the book (or other media item) exists in digital form, and the bookmark distribution component 110 electronically delivers the book to the user via a network coupling.

The bookmark distribution component 110 can rely on additional strategies and functionality to deliver the bookmark 112 and ordered book(s) to the user.

After dissemination of the bookmark 112 to the user, the follow-through component 214 of the bookmark processing component 108 may come into play. To repeat, the purpose of the follow-through component 214 is to interact with the user when the user contacts the electronic service in response to the enticements provided by the bookmark 112. As one its first operations, the follow-through component 214 establishes whether the user is contacting the electronic service in response to the receipt of the bookmark 112. This is to distinguish the user's session from a conventional shopping session (which does not make reference to a bookmark). The follow-through component 214 can determine the purpose of the user's session in various ways.

According to one approach, the follow-through component 214 can prompt the user to enter a specific code that is printed on the bookmark 112, or otherwise communicated by the bookmark 112. For example, when prompted, the user can type in an alphanumeric code that is printed on the bookmark 112. According to another approach, the user can use any kind of reading mechanism to automatically read code information provided by the bookmark 112. For example, the follow-through component 214 can employ any one or more of a barcode scanner, magnetic strip reader, optical character recognizer, and so forth, to read coded information provided on (or in) the bookmark 112. In yet another case, the follow-through component can wirelessly receive code information from the bookmark 112, wherein the bookmark 112 acts as a passive or active transponder or the like.

In another approach, the follow-through component 214 can deduce the fact that the user is accessing the electronic service in response to the receipt of the bookmark 112. For example, the follow-through component 214 can provide content that is appropriate to a particular bookmark for a predetermined interval of time after the delivery of the bookmark 112 to the user. This approach is based on the assumption that there is a reasonable probability that the user will contact the electronic service in a certain interval of time (e.g., days, weeks, months, etc.) after receiving the bookmark 112. In this case, the electronic service can optionally ask the user to confirm whether he or she is contacting the service in response to the receipt of the bookmark 112.

The follow-through component 214 can use any other basis for determining that the user is accessing the electronic service in response to the recent receipt of the bookmark 112.

After the follow-through component 214 has ascertained the purpose of the user's session, the follow-through component 214 can proceed to provide one or more user interface pages and other content. These pages can be customized based on the identified bookmark 112 that has been delivered to the user. In one case, the follow-through component 214 may provide one or more user interface pages that complement the call-to-action information printed on the bookmark 112. For example, in the case in which the call-to-action information invites the user to enter a review of a purchased book, the follow-through component 214 can provide one or more user interface pages that are specifically tailored to allow the user to enter his or her comments. In the case in which the call-to-action information invites the user to purchase one or more books recommended by the bookmark 112, the follow-through component 214 can provide one or more product detail pages associated with the recommended books, or can present an order entry page, and so on. The follow-through component 214 can provide yet other kinds of content that complements the information imparted by the bookmark 112.

Advancing finally to the tracking component 216, the purpose of this component 216 is to register actions taken by the users. Where applicable, the tracking component 216 can also correlate the users' actions to the bookmarks which motivated such actions. The tracking component 216 can use this tracking information to perform comparative analysis. For example, the tracking component 216 can determine the effectiveness of a certain bookmark message by noting changes in user behavior following the introduction of the message (where all other parts of the bookmark remain the same). The tracking component 216 can also compare bookmark-inspired behavior relative to non-bookmark inspired behavior.

A.3. Exemplary User Device

The user can rely on any type of user device to interact with the electronic service provided by the operations system 102. FIG. 3 shows the exemplary components of the representative user device 104 (introduced in FIG. 1). In the most common case, the device 104 corresponds to a computer device, such as a personal computer, laptop computer, and so forth. But the device 104 may also correspond to a mobile telephone, a Personal Digital Assistant (PDA) device, a set-top box coupled to a television, a stylus-type input device, any kind of wearable computer, an electronic book-reader device, a personal media player, a game console device, and so forth.

In any event, the device 104 can comprise as main parts: a processing unit 302; a presentation unit 304; and an input unit 306. The processing unit 302 generally corresponds to functionality (e.g., software logic, and/or circuitry, etc.) for processing information. The processing unit 302 can optionally include client-side functionality 308 which allows the user device 104 to interact with the operations system 102. To name one example, the client-side functionality 308 can include local functionality for receiving codes from the bookmark 112. In general, one or more of the functions described above as being performed by the operations system 102 can be performed in whole or in part by the client-side functionality 308.

The presentation unit 304 generally corresponds to any mechanism or combination of mechanisms for presenting the processed information. For example, the presentation unit 304 can present a graphical user interface 310 for interacting with the user. The input unit 306 generally corresponds to any mechanism or combination of mechanisms for inputting data and instructions to the processing unit 108.

A.4. Exemplary Bookmarks

Figure 4:
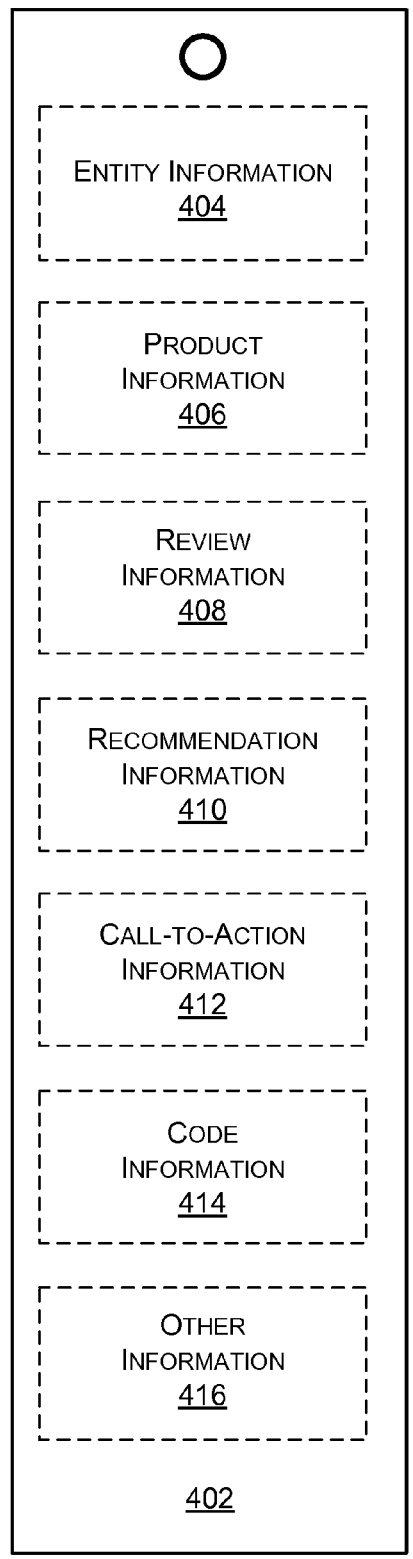
FIG. 4 shows a structure of one exemplary bookmark that can be delivered via the system of FIG. 1.

FIG. 4 shows one exemplary bookmark 402 that can be generated by the system 100 of FIG. 1. As shown there, the bookmark 402 can have a generally rectangular shape, like a traditional bookmark. However, the system 100 can generate a bookmark having any shape.

The system 100 can generate the bookmark 402 from any material or combination of materials. In one case, the system 100 can print the bookmark data on a paper-based substrate. In other cases, the system 100 can print (or, more generally, form) the bookmark data on substrates of plastic, metal, wood, etc.

As explained above, the bookmark 402 can include plural messages, referred to herein as informational items. Exemplary types of informational items were described above. These items are enumerated below again for completeness. The illustrated organization of informational items on the bookmark 402 is strictly exemplary; that is, other approaches can adopt different arrangements of items. Moreover, in one case, the system 100 can vary the style and/or content of the bookmarks over time to better maintain the interest of the recipients. The system 100 may, for example, cycle through a set of different bookmark styles over time.

A first informational item 404 comprises information that identifies a sponsor of the bookmark 402, or some other entity associated with the bookmark 402. The identified entity may, in addition or alternatively, correspond to the entity that the user is encouraged to contact by the call-to-action information (to be discussed).

A second informational item 406 provides any type of information which describes the book (or books) that the user has ordered. In other words, this informational item 406 describes the books that are placed in the same package with the bookmark 402. The second informational item 406 can include textual and/or pictorial information which describes the books, or yet some other form of information.

A third informational item 408 identifies how others have reviewed the books described in the second informational item. For example, the third informational item 408 can use a multi-star rating to indicate the average customer review of a purchased book.

A fourth informational item 410 provides one or more recommendations. As described at length above, the system 100 can customize the recommendations so that they have a bearing on the context in which the bookmark 402 is being delivered. For instance, the recommendations may have a nexus to the books that the user has ordered. Alternatively, or in addition, the recommendations may have a relationship to the demographic characteristics of the recipient user, and so forth.

A fifth informational item 412 provides call-to-action information. As the name suggests, this field encourages the user to take specific action, such as by contacting the electronic service to review a book, or to purchase a recommend book, and so on.

A sixth informational item 414 provides one or more codes associated with the bookmark 402. As described above, these codes, when entered into the follow-through component 214 by the user, allow the operations system 102 to correlate the user's online actions with the receipt of the bookmark 402, that is, to thereby ascertain that the user's behavior is being motivated by the information imparted by the bookmark 402.

Finally, a generically-labeled seventh informational item 416 ("other information") indicates that the bookmark 402 may contain any number of additional types of messages. In addition, or alternatively, a bookmark 402 can omit any one or more of the above-identified first through sixth informational items.

FIG. 4 shows the generation of a physical bookmark—namely, a bookmark that can be physically manipulated by the user. The physical bookmark includes information printed (or otherwise formed) on its face or faces. In other cases, the operations system 102 can provide a physical bookmark that uses alternative mechanisms for retaining and conveying informational items (that is, besides printing the items on its face). For example, the operations system 102 can produce a bookmark which records informational items using a magnetic storage medium, a static memory storage medium, an optical storage medium, and so on. Further, the bookmark 402 can represent its information in audio form, instead of, or in addition to, visual form.

In yet another case, the operations system 102 can produce an electronic bookmark (e.g., instead of a physical bookmark that can be held). The operations system 102 can transmit such a bookmark to the user. Upon receipt, the user can print out the bookmark to produce a physical bookmark. Alternatively, or in addition, a user can receive and consume the electronic bookmark in electronic form (e.g., using an eBook reader device or a like device). The system 100 can adopt yet other variations of the bookmark 112.

Figure 5:
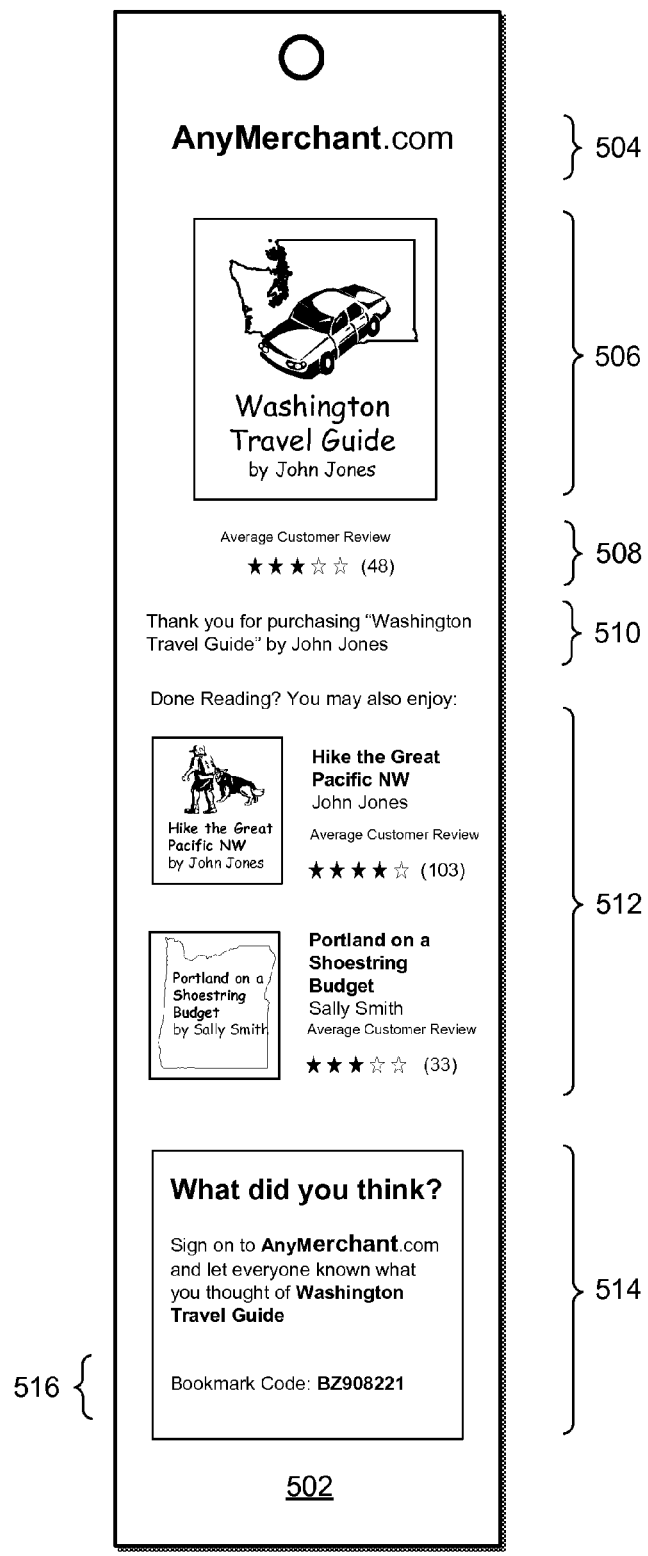
FIG. 5 shows one exemplary instance of the bookmark of FIG. 4.
Figure 6:
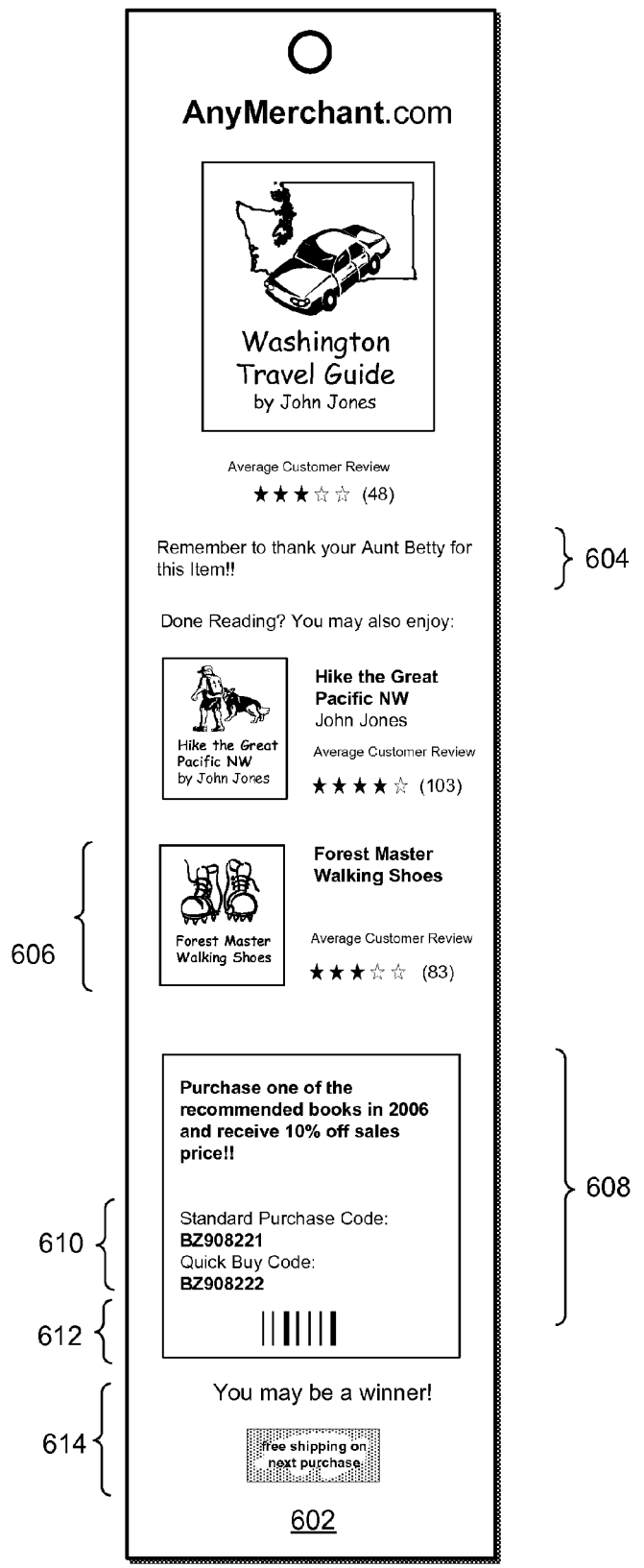
FIG. 6 shows another exemplary instance of the bookmark of FIG. 4.

FIGS. 5 and 6 provide specific exemplary instances of the bookmark 402 introduced by FIG. 4. To provide some context, assume in this scenario that a travel guide book entitled "Washington Travel Guide" has been purchased by a user (or that this book has been purchased as a gift for the user by another).

Starting with FIG. 5, the illustrated bookmark 502 includes a static informational item 504 ("AnyMerchant.com") to identify an entity that has generated the bookmark 502. In addition, or alternatively, the static informational item 504 corresponds to the entity that should be contacted in response to the call-to-action information provided by the bookmark 502 (to be described).

Another informational item 506 includes a textual and pictorial description of the item that the user has purchased, namely "Washington Travel Guide" by hypothetical author John Jones.

Another informational item 508 provides an average customer review of the purchased book.

Another informational item 510 conveys a message of thanks to the user for purchasing the identified book. Alternatively, or in addition, this type of message can identify the date when the user purchased the book. This type of information memorializes the user's purchase, and thus may be particularly useful and/or interesting to the user if the user returns to the book some time after setting it aside. The bookmark 502 can convey many other kinds of messages, such as "Happy $12^{th}$ birthday Ethan!" In one case, a first user can optionally create a message that the bookmark delivers to a second user (who is the recipient of the bookmark 502 and associated book).

Another informational item 512 provides one or more recommended books. The recommended books may be generated based on the various contextual factors described above. The informational item 512 may include textual and/or pictorial information that describe the recommended books, and/or yet some other type of information.

Another informational item 514 provides a specific call-to-action, encouraging the user to access the electronic service and perform an identified action. In the illustrated case, the informational item 514 invites the user to access the electronic service to review the purchased book, "Washington Travel Guide." The user may be particularly motivated to do so when he or she strongly agrees or disagrees with the average customer rating provided in item 508, or is being rewarded for doing so.

Finally, the call-to-action may also optionally include one or more codes 516. A user may input the codes into the electronic service (via the follow-through component 214) to help correlate the user's actions with the receipt of the bookmark 502.

Once again, the various informational items shown in FIG. 5 are representative of a great variety of items that can be conveyed by a bookmark. The illustrated organization of such items is likewise exemplary. Other implementations can omit one or more informational items shown in FIG. 5, and/or include additional informational items not shown.

FIG. 6 illustrates a bookmark 602 that is an exemplary variation of the bookmark 502 shown in FIG. 5. The new informational items included in the bookmark 602 will be described below.

One new informational item 604 notifies the user that the identified book ("Washington Travel Guide") is a gift from another person. Optionally, as mentioned above, this item can also convey a message from the giftor to the giftee.

Another new informational item is recommendation 606. For frame of reference, all of the recommendations in the bookmark 502 of FIG. 5 pertain to books, thus representing recommendations in the same class of products as the purchased article (which is a book). By contrast, in FIG. 6, the recommendation 606 identifies hiking boots. This product is related to the book purchased by the user, but nevertheless represents a different product class than the purchased article. Similarly, the recommendation 606 can include other articles, such as movies, tools, music, etc.

Another new informational item 608 provides a different call-to-action compared to the case of FIG. 5. Namely, in FIG. 6, the call-to-action encourages the user to purchase one of the recommended items. The informational item 608 also entices the user to contact the electronic service by promising to discount the user's next purchase.

Another new informational item 610 is the code information associated with the call-to-action. In this case, the code information consists of two codes. The user can enter a first code into the electronic service to purchase a recommended item using a standard purchase routine. The user can enter a second code to purchase the recommended item using an expedited purchase routine, wherein the expedited purchase routine requires less interaction with the user compared to the standard purchase routine. FIG. 6's reference to two code options is merely representative; the bookmark 602 can include any number of code options.

Another new informational item 612 expresses at least part of the code information in machine-readable form (in this case, barcode form). Automatic reading equipment (not shown) at the user's device or elsewhere can be employed to automatically read this code, as opposed to asking the user to manually enter the code information.

Finally, another new informational item 614 provides a scratch-off field, code, or the like that reveals some kind of prize or the like, such as a cash reward, a discount, and so forth. The electronic service can create a certain percentage of prize-winning bookmarks. Further, the electronic service can offer different types of benefits of varying value through its bookmarks.

Still other types of informational items can be included in the alternative bookmark 602.

A.5. Exemplary User Interface Presentations

Figure 7:
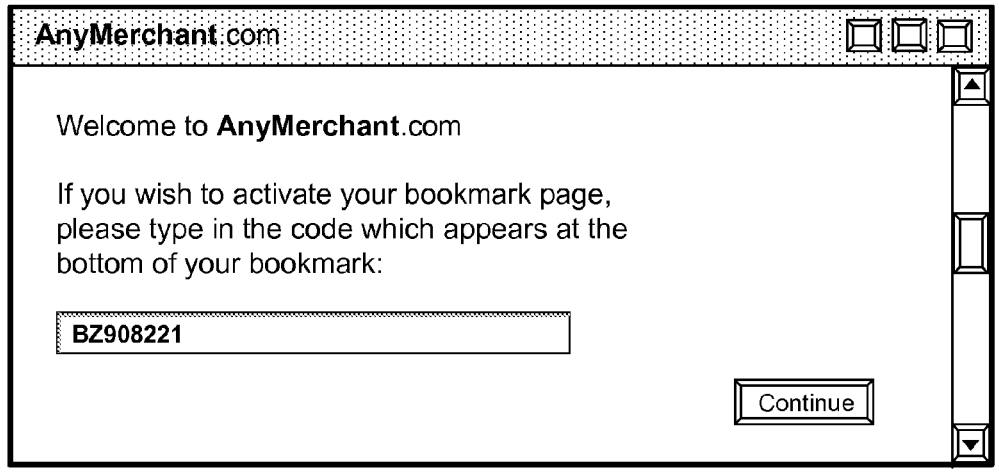
FIGS. 7 and 8 show exemplary user interface presentations that enable a user to interact with the system of FIG. 1 upon receiving the bookmarks or other functional objects.
Figure 8:
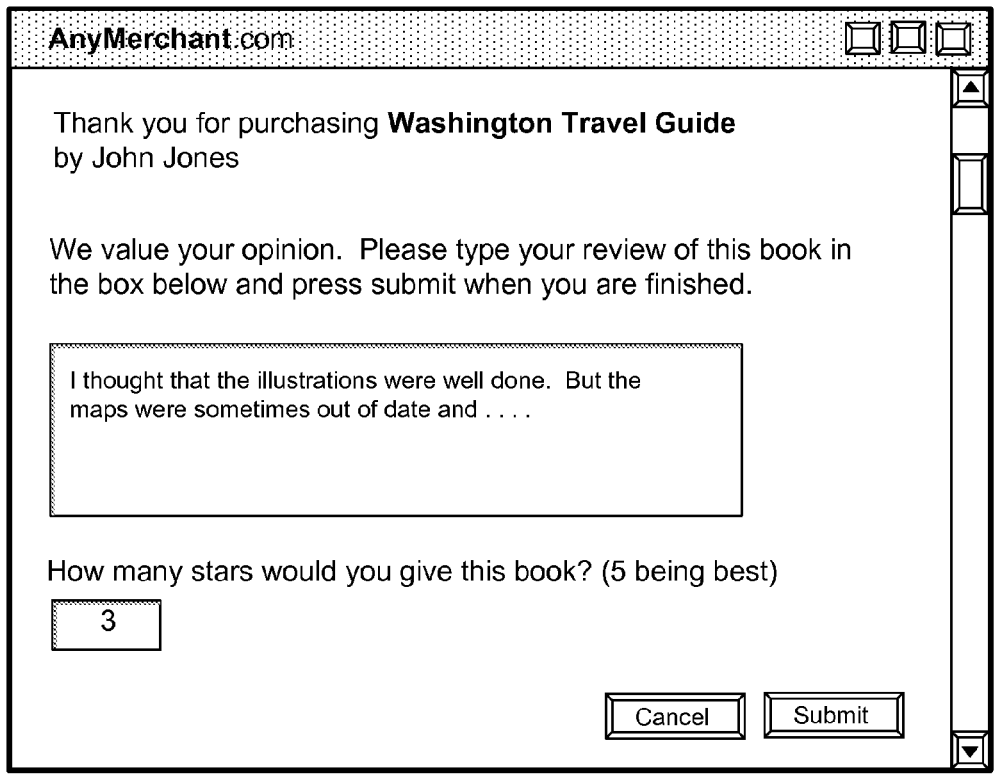

In the follow-through phase of the user's interaction with the system 100, the user applies his or her user device 104 to access the electronic service (provided by the operations system 102). The user may perform this task using browser functionality provided by the user device 104. FIGS. 7 and 8 illustrate two exemplary user interface pages that the operations system 102 may present to the user upon access to the electronic service. The selection, formatting, and organization of information shown in these figures are representative.

Starting with FIG. 7, this figure shows a user interface presentation 700 that may be presented to the user upon initially signing on to the electronic service. The operations system 102 (and, in particular, the follow-through component 214) first seeks to establish whether the user is accessing the electronic service in response to the receipt of a bookmark. The operations system 102 can accomplish this task by asking the user to enter the code information printed on the bookmark. If the user is not accessing the electronic service in response to the receipt of a bookmark, the user may activate the command button "continue" (or the like) without entering a code. The operations system 102 will interpret this action as an indication that the user wants to engage the merchandising functionality 202 in a traditional shopping session, not tied to the use of bookmarks.

FIG. 8 shows another user interface page 800 that may be presented to the user following input of a bookmark code. In this case, the call-to-action on the bookmark solicits the user to access the electronic service to enter a review of the purchased item ("Washington Travel Guide"). As such, the operations system 102 can present the user interface page 800 to the user. This page 800 is specifically configured to solicit the user's review of the purchased book. Other types of user interface pages may be appropriate for different types of calls-to-action.

A.6. Illustrative Processing Functionality

FIG. 9 shows illustrative processing functionality 900 that can be used to implement various aspects of the system 100 shown in FIG. 1, such as the user device 104, the operations system 102, any component of the operations system 102, and so forth. The processing functionality 900 can represent, without limitation, any one or more of: a personal computer; a laptop computer; a server-type computer; a book-reader type device; a portable media player device; a personal digital assistant (PDA) device; a mobile telephone device; a tablet-type input device; any kind of wearable device; a game console device; a set-top box device, and so on. To facilitate discussion, the processing functionality 900 is described below as specifically implementing the representative user device 104, although, as stated, the generic processing functionality 900 also sets forth an architecture of a server-type computer that can be deployed at the operations system 102.

In this local device context, the processing unit 302 can comprise one or more processing components 902 (such as a CPU, neural network, etc.), RAM 904, RAM 906, media components 908 (such as a hard drive, DVD drive, etc.), network interface 910 (such as a telephone or cable modem, broadband connectivity mechanism, etc.), and an I/O interface 912 for interacting with input devices and output devices. One or more buses 914 couple the above-described components together.

The output device(s) can include the presentation unit 304, which presents the graphical user interface 310. The input device(s) 306 can include any one or more of a keyboard, mouse input device, track ball input device, joystick input device, touch sensitive screen, and so forth.

In any application of the processing functionality 900, various functions can be implemented as machine-readable instructions that reside in any storage unit or combination of storage units shown in FIG. 9, and the processor 902 can execute these instructions to produce desired data mining and/or search-related operations.

B. Illustrative Procedures

Figure 10:
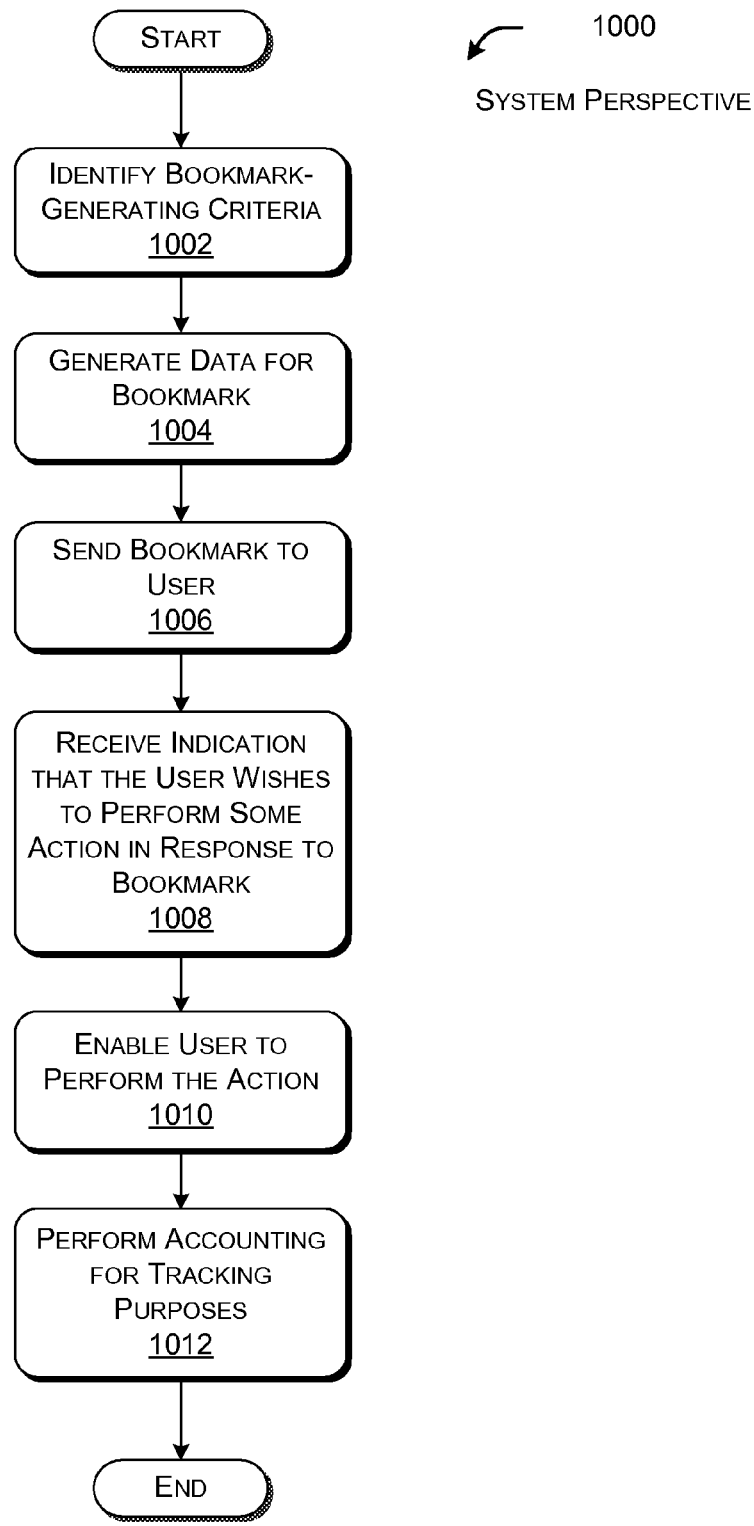
FIG. 10 shows an exemplary operations system procedure for delivering a bookmark or other functional object to a user, and, then, for subsequently interacting with the user to carry out a transaction associated with the bookmark.
Figure 11:
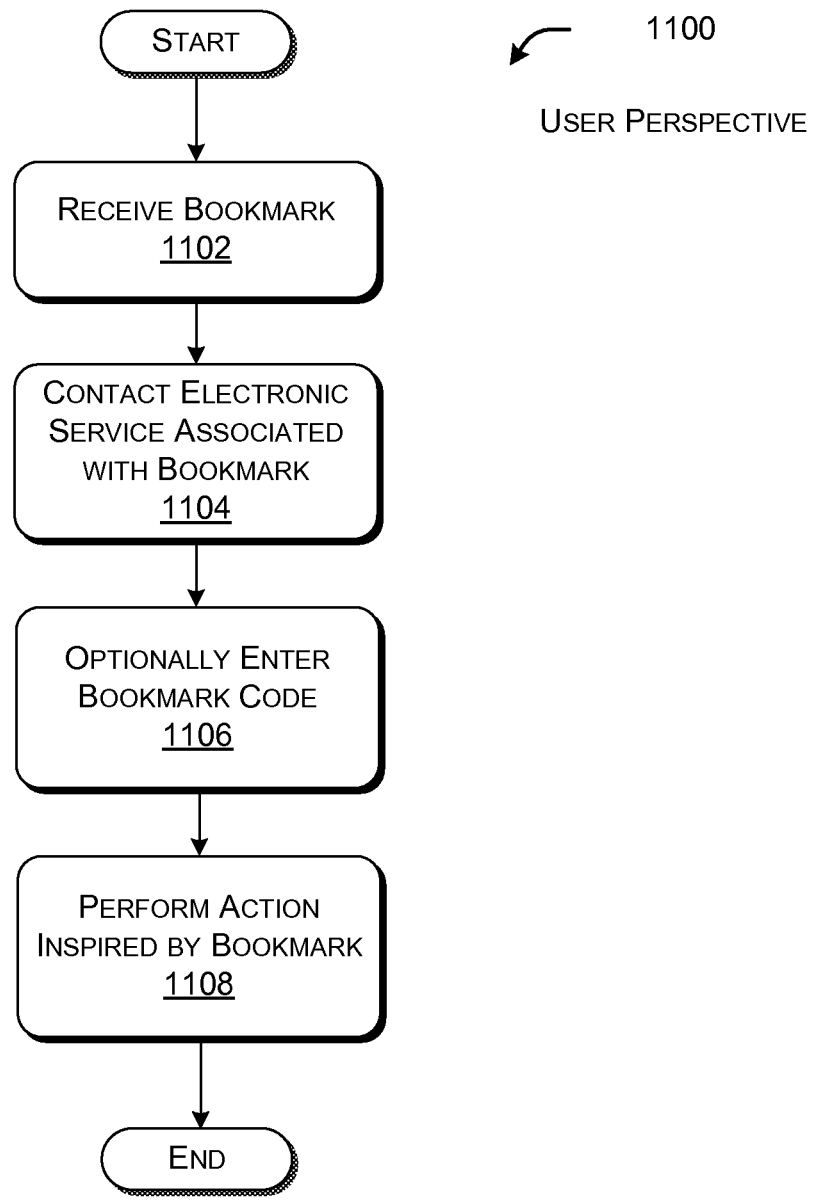
FIG. 11 shows an exemplary procedure which complements, from the perspective of the user, the procedure of FIG. 10.

FIGS. 10 and 11 describe the operation of the system 100 of FIG. 1 in flow chart form. To facilitate discussion, certain operations are described as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, or by a combination of these elements.

As the functions described in the flowcharts have already been set forth in Section A, Section B serves primarily as a review of those functions.

B.1. Procedure from the Standpoint of the Operations System

FIG. 10 shows, from the "standpoint" of the operations system 102, an illustrative procedure 1000 for creating bookmarks and for processing the user's response to the bookmarks.

In operation 1002, the operations system 102 generates bookmark-generating criteria. In other words, in this operation, the operations system 102 determines one or more factors that will be used to generate the information that will be printed on the bookmark. These factors may include the identity of the book(s) that the user has purchased, the characteristics of the user himself or herself, and so on.

In operation 1004, the operations system 102 generates the bookmark based on the factors identified in operation 1002, in the manner described above. In one implementation, a fulfillment center may perform the actual task of creating or generating the physical bookmark based on the data generated in operation 1004.

In operation 1006, the operations system 102 delivers the purchased book(s) and created bookmark(s) to the user. In one case, this operation corresponds to placing a purchased book and an associated bookmark into a package for shipment to the user. In alternative cases, the purchased book and/or bookmark can be sent to the user in electronic form. The book and bookmark can be sent via the same delivery channel or different respective delivery channels.

In operation 1008, the operations system 102 receives some indication that the user is accessing the electronic service in response to the receipt of a bookmark. This indication can take the form of receiving telltale code information from the user, which links the user's session to the delivered bookmark.

In operation 1010, the operations system 102 enables the user to perform one or more actions. These actions may carry out the call-to-action information identified on the bookmark. For instance, operation 1010 may correspond to entering a book review, purchasing a recommended book, and so on.

In operation 1012, the operations system 102 can perform accounting which registers the fact that the user has performed one or more actions in response to the receipt of a bookmark.

B.2. Procedure from the Standpoint of a User

FIG. 11 shows a procedure 1100 which complements the procedure 1000 of FIG. 10. Namely, the procedure 1100 of FIG. 11 shows the operation of the system 100 from the standpoint of a user.

In operation 1102, the user receives a bookmark from the operations system 102. The user may receive this bookmark in response to ordering one or more books (or other articles). The operations system 102 may deliver the bookmark along with the ordered books in one or more packages. As described above, alternative mechanisms can be used to forward the bookmark (as well as the ordered books).

In operation 1104, the user contacts the electronic service provided by the operations system 102, e.g., after having been properly motivated to do so by the call-to-action information provided by the bookmark.

In operation 1106, the user may enter one or more codes associated with the bookmark to identify the fact that the user intends to take some action in response to the bookmark.

In operation 1108, the user performs whatever action has been solicited by the bookmark, or yet some other action(s). In response to the entry of a valid bookmark code, the operations center 102 can present one or more customized user interface pages, through which the user may interact with the electronic service.

In closing, a number of features were described herein by first identifying illustrative problems that these features can address. This manner of explication does not constitute an admission that others have appreciated and/or articulated the problems in the manner specified herein. Appreciation and articulation of the problems present in the relevant art(s) is to be understood as part of the present invention. Further, the identification of one or more problems herein does not suggest that the invention is restricted to solving only those problems. In other words, the invention may address additional needs that are not expressly identified herein.

More generally, although the invention has been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

What is claimed is:

1. A computerized method for directing a user to engage with an electronic service, comprising:
   receiving a user's request for a media article;
   generating a bookmark to mark a location within the media article, the bookmark customized to the user based at least in part on identified characteristics of the user and one or more media articles previously accessed by the user;
   providing the media article to the user along with the bookmark, wherein the bookmark imparts information to the user including recommendation information based at least in part on the identified characteristics and the one or more previously accessed media articles, the recommendation information suggesting one or more other media articles to the user;
   receiving a request from the user for an electronic service, the user's request for the electronic service being motivated by the information imparted by the bookmark; and
   providing the electronic service to the user.

2. The computerized method of claim 1, wherein the media article is a book.

3. The computerized method of claim 1, wherein the providing of the media article comprises physically shipping the media article and the bookmark to the user in one or more physical packages.

4. The computerized method of claim 1, wherein the providing of the media article comprises electronically delivering at least one of the media article or the bookmark to the user.

5. The computerized method of claim 4, wherein the providing of the media article comprises electronically delivering the media article to the user via a digital network.

6. The computerized method of claim 4, wherein the providing of the media article comprises delivering the media article in one or more physical packages, and electronically delivering the bookmark to the user via a network.

7. The computerized method of claim 1, wherein the information imparted by the bookmark includes plural informational items.

8. The computerized method of claim 1, wherein the information imparted by the bookmark includes description information that describes the media article requested by the user.

9. The computerized method of claim 1, further comprising generating the recommendation information based on a consideration of a nexus between the media article requested by the user and said one or more other media articles.

10. The computerized method of claim 9, wherein the nexus is based at least in part on prior reviews made by a group of users.

11. The computerized method of claim 9, wherein the nexus is based at least in part on prior selections made by a group of users.

12. The computerized method of claim 1, further comprising generating the recommendation information based on a consideration of at least one characteristic of the user.

13. The computerized method of claim 1, wherein the information imparted by the bookmark includes code information, said code information being used to access customized features of the electronic service.

14. The computerized method of claim 1, wherein the information imparted by the bookmark includes call-to-action information, wherein the call-to-action information includes at least one or more of:
   an invitation to access the electronic service to enter a review of the media article requested by the user; or
   an invitation to access the electronic service to request another media article.

15. The computerized method of claim 1, wherein the electronic service is a network-accessible merchandising service through which users can acquire consumable goods.

16. The computerized method of claim 1, wherein the electronic service that is provided to the user is customized based on identifying information which indicates that the user has accessed the electronic service in response to the receipt of the bookmark.

17. The computerized method of claim 16, wherein the identifying information comprises code information, and wherein the user requests the electronic service by, at least in part, entering the code information.

18. The computerized method of claim 1, further comprising tracking actions taken by users that are linked to the prior receipt of bookmarks.

19. One or more computer-readable storage media containing computer-readable instructions for implemented the computerized method of claim 1.

20. One or more computing devices, comprising:
   one or more processors; and
   memory to store computer-executable instructions that, when executed by the one or more processors, perform the computerized method of claim 1.

21. A computerized method for directing a user to engage with an electronic service, comprising:
   receiving a user's request for a media article;
   determining characteristics of the user;
   generating a bookmark, the bookmark to mark a location within the media article and imparting information to the user that encourages the user to access an electronic service, wherein the information is customized based at least in part on the determined characteristics of the user; and
   providing the media article to the user along with the bookmark, wherein the information imparted by the bookmark includes ranking information that ranks the media article requested by the user by a group of other users.

22. The computerized method of claim 21, wherein the providing comprises shipping the media article and the bookmark to the user in one or more physical packages.

23. One or more computer-readable storage media containing computer-readable instructions for implemented the computerized method of claim 21.

24. One or more computing devices, comprising:
   one or more processors; and
   memory to store computer-executable instructions that, when executed by the one or more processors, perform the computerized method of claim 21.

* * * * *